3,679,411
NOVEL FRICTIONAL RESISTANCE MOTION PICTURE FILM
Robert K. Stephens, Burlington, Mass., assignor to Polaroid Corporation, Cambridge, Mass.
No Drawing. Filed July 13, 1970, Ser. No. 54,613
Int. Cl. G03c 5/54
U.S. Cl. 96—29         16 Claims

ABSTRACT OF THE DISCLOSURE

Exposed motion picture film is processed with a developing composition containing a friction reducing agent to impart slip properties to the film thereby minimizing frictional resistance as the film contacts various mechanisms involved in transporting, storing and projecting film strips, thus minimizing a lack of uniformity in film transport rates and obviating damage to the film as a result of frictional resistance.

BACKGROUND OF THE INVENTION

U.S. application Ser. No. 755,901, filed Aug. 28, 1968, now Patent No. 3,615,127, is directed to motion picture system which incorporates a compact motion picture cassette capable of performing the functions of exposing a photosensitive film contained therein and subsequently not only processing the film to develop the images recorded thereon but also projecting the images or otherwise presenting them from viewing purposes. The motion picture system described therein makes use of a compact multipurpose film cassette within which the several operations of exposure, chemical processing, drying and projection of the recorded images may be accomplished without transferring the film from the cassette to any other cassette or any other container or, in fact, removing the film from the original cassette at all. Thus, the aforementioned application obviates the prior art methods of treating exposed cinematographic films which are conventionally sent to film developing laboratories, generally in a completely different container from that in which the film was originally exposed, and which is then, subsequent to processing, returned to the user, threaded into and through a projector mechanism and run between reels which are generally unconnected with each other except through the projection mechanism. As described in the above-mentioned application Ser. No. 755,901, when substantially the entire length of the film strip in the cassette has been exposed and thus wound onto the take-up reel, the cassette is then loaded into a special purpose projector in which the motion of the film is reversed so that the film now passes from the take-up reel onto the supply reel. During this motion of the film, the film strip is subjected to a processing treatment wherein a processing composition is applied to the exposed portions of the film strip by suitable means. Preferably, a negative emulsion is used which will be described in detail below which, after development, possesses low covering power and which therefore need not subsequently be removed from the film strip. Drying may be employed if desired. The described cassette, as well as containing stations for the initial exposure of the film, the processing and drying of the film, also includes provision for the projection of the images recorded on the film. Thus, U.S. application Ser. No. 755,901 which is incorporated herein in its entirety, provides for a method of exposing, processing and projecting motion picture film.

The film assembly employed in the above-indicated application comprises a photosensitive negative emulsion and image-receiving layer to which a positive image may be transferred by diffusion during development without the necessity thereafter of removing the emulsion containing its developed negative image. As indicated above, this is possible if the developed negative image has low covering power.

In typical silver transfer reversal processes for the production of black and white images, a silver halide developer and a silver halide solvent are applied in aqueous alkaline solution to a photoexposed silver halide stratum or emulsion where they develop exposed silver halide to silver and react with unreduced silver halide to form a soluble silver complex. This complex, in order to form a positive print, is transferred and reduced to silver on a silver receptive stratum upon which the silver halide stratum has been superposed. It has similarly been practiced, subsequent to image formation, to separate the silver receptive and silver halide strata in order to render the positive print visible.

The positive print may, however, be rendered visible without the separation of the silver halide and silver receptive strata. For example, the silver receptive stratum may be so constituted as to provide an unusually vigorous silver precipitating environment which causes the silver deposited on it, in comparison with silver developed in the silver halide stratum, to possess a very high covering power, that is opacity per given mass of reduced silver. If the silver halide is in such a concentration as to give rise only when fully developed to a predeterminedly low maximum density, and if the silver complex is reduced to silver in a vigorous silver precipitating environment, the resulting negative and positive prints in superposed position provide a composite print that presents a good image for projection purposes as long as they are contained on a transparent support. Because the silver halide stratum and silver receptive stratum need not be separated, an overall simplification of the silver transfer reversal process is achieved.

The processing of the film unit to provide the development of the photoexposed emulsion is carried out by contacting the photoexposed emulsion with a solution containing a conventional developing agent such as one or more of the conventional developing agents and compositions set forth in Chapter 14 of The Theory of the Photographic Process (Revised Edition, 1954) C. E. K. Mees, the Macmillan Company, New York, N.Y., and Chapters 6, 7, 8 and 9 of Photographic Chemistry, Volume 1, P. Glafkides, Foundation Press, London, England. The preferred developing agents generally comprise organic compounds and in particular comprise organic compounds of the aromatic series containing at least two hydroxyl and/or amino groups wherein at least one of such groups is one of ortho or para poistions with respect to at least one other of such groups such as, for example, the various known hydroquinones, p-aminophenols, p-phenylene diamines, and their various known functional homologues and analogues. The developing composition containing the specific silver halide developing agents selected will generally comprise an aqueous solution additionally containing at least an alkaline material such as sodium hydroxide or sodium carbonate or the like and may be contacted with the photoexposed silver halide material according to any of the conventional tray, tank, or the like, procedures. The composition may additionally and optionally contain one or more specific silver halide developing agents, preservatives, alkalis, restrainers, accelerators, etc., other than those specifically denoted in the cited reference material. The concentration of the various components employed may be varied over a wide range and, where desirable, any one or more of such components may be disposed in the photosensitive element, prior to exposure, and in a separate permeable layer of such element and/or in the emulsion comprising the photosensitive silver halide material itself.

For the purpose of stabilizing the developed image, the emulsion may be fixed in any of the conventional fixing, washing, and/or drying procedures known in the art as, for example, those described in Chapter XI of Photographic Chemistry, Volume I, supra, and Chapter 17 of The Theory of the Photographic Process, supra. For example, the photosensitive material retaining the developed image may be initially contacted with a stop bath adapted to terminate action of the developing agent on the photosensitive emulsion by converting the pH of the emulsion to that at which the selected silver halide developing agent or agents exhibit substantially no developing potential. Specifically, where the silver halide developing agent is an organic compound exhibiting its developing action at an alkaline pH, for example, a hydroquinone, or the like, the emulsion may be subjected to an acid stop bath for a sufficient time interval as to effectively neutralize the silver halide developing potential of the selected developing agent.

The emulsion may then be subjected to a fixing bath in order to effect removal of unexposed photoresponsive silver halide from the emulsion in accordance with the conventional procedures known to the art as adapted to effect same and as further detailed in the last cited references.

In general, the fixing agent employed may comprise a bath of a silver halide solvent such as sodium thiosulfate which is effective to remove substantially all types of silver halides from disposition in the emulsion strata originally containing the photosensitive silver halide without deleterious attack upon the conformation of the developed silver image. Subsequent to fixation, all residual traces of the fixing agent may be removed by aqueous wash contact, in order to insure the permanency of the developed image.

Film assemblies which produce fully developed black and white image without the necessity of removing the developed negative image after processing are shown in U.S. Pat. No. 2,861,885, issued Nov. 25, 1958. Suitable film assemblies capable of producing developed full color images without the necessity of removing the developed emulsion are shown in U.S. Pats. Nos. 2,726,154, issued Dec. 6, 1965 and 2,944,894 issued July 12, 1960. As disclosed in the cited patents, transfer processing of the exposed film may be accomplished by permeation of the exposed integral film unit with a liquid processing composition and the image-receiving layer retained in permanent fixed relationship to an additive color screen during and subsequent to formation of the requisite transfer image.

Improved integral silver diffusion transfer film assemblages essentially comprising photoresponsive material directly providing positive image formation and possessing the sensitivity to incident magnetic radiation and acuity of image formation necessary to effectively provide photographic image reproduction, both black and white and assemblages including optical screen elements to provide color photographic image reproductions, are disclosed and claimed in the following copending applications which are directed in general to film unit assemblages which comprise a permanently fixed laminate which includes a support carrying on one surface of said support photosensitive silver halide crystals and silver precipitating nuclei:

| Application Serial No. | Filing date |
| --- | --- |
| 736,796 | June 13, 1968. |
| 889,656 | Dec. 31, 1969. |
| 889,657 | Do. |
| 889,660 | Do. |
| 889,636 | Do. | now U.S. Pat. No. 3,536,488 issued Oct. 27, 1970 and U.S. Pats. Nos. 3,615,427; 3,615,428, 3,615,429; and 3,615,426, all issued Oct. 26, 1971, respectively.

The aforementioned applications are incorporated by reference herein in their entirety.

In the above-indicated film assemblages the silver precipitating nuclei are present in a concentration effective to provide a silver image to the film unit possessing optical density inversley proportional to exposure of the photosensitive silver halide layer, and specifically, in a concentration adapted to provide a silver image derived from unexposed silver halide crystals possessing greater covering power than that of corresponding silver image derived from identical quantum of exposed silver halide crystals.

As set forth in the above-indicated applications, it has been unexpectedly discovered that improved image reproduction may be obtained by means of the improved silver image characteristics provided by reason of the present invention. Specifically, the above-indicated applications state that composite negative/positive silver image formation possessing an optical density inversely proportional to photoexposure of a photosensitive silver halide layer, characterized by improved silver image minimum and maximum optical densities and image acuity may be achieved by a process which includes exposing a photographic film unit, which comprises a permanent laminate containing a support carrying on one surface at least two separate and discrete layers containing silver precipitating nuclei and a photosensitive silver halide layer positioned intermediate two silver precipitating nuclei containing layers and processing the film unit by contact, simultaneous with, or subsequent to, exposure, with an aqueous processing composition, containing a silver halide developing agent and a silver halide solvent, to provide to the film unit the direct formation of a silver image possessing particularly desired low minimum silver image optical density, in terms of exposed areas of the film unit, and high maximum silver image optical density, in terms of unexposed areas of the film units, as a function of exposure and development of the film unit. According to the above-indicated applications, there is thus provided a film unit assemblage structure which is a permanently fixed laminate and comprises a common support carrying, in order on one surface, a first silver precipitating nuclei containing layer, and a second silver precipitating nuclei containing layer.

Conventional multistage processing of motion picture film includes a processing station wherein a lubricant is applied to the photographic film surface. Because during its projection and rewinding, the motion picture film is repeatedly subjected to contact with mechanical apparatus, particularly pressure plates, since it is essential that the film be maintained in a single plane during its projection. The repeated passage of the film strip over relatively flat, generally metallic surface results in friction contact of nonuniform nature which can result in frictional resistance to the passage of such motion picture film to the extent that the film binds at the point of frictional contact resulting in jerky, nonuniform transport of the film over the given area and consequently through the entire transport operation to the detriment of the quality of the projected motion picture, as well as to the detriment of the physical structure of the film strip itself.

Thus, repeated binding of the film strip and frictional resistance counteracted by the pull of the take-up reels could result in breakage of the film strip.

SUMMARY OF THE INVENTION

A novel process and composition has now been found to provide for minimizing or obviating entirely, frictional resistance of motion picture film wherein the recorded images of the film are developed by the application of a single processing composition.

This invention relates to a process for applying a processing composition and to the processing composition employed for developing to a visible condition images recorded on motion picture film wherein the processing composition contains a lubricant or friction reducing agent to impart slip properties to the film to obviate binding of the film as its passes through the projector and other mechanical handling devices. The movement of the film strip past a flat surface, for example, the pressure plate in the projector, is smoother as a result of the film having been treated with the novel processing composition of the present invention whereby substantially no interruption to the uniform drive of the take-up reel is exerted by the frictional resistance of the film itself.

The invention also relates to a developing composition having a lubricant for the film incorporated therein.

DETAILED DESCRIPTION OF THE INVENTION

The novel processing composition of the present invention contains a friction reducing agent or lubricant for the film therein so that as the processing composition contacts the film, the lubricant is deposited on the surface of said film while the remainder of the processing composition permeates the film unit to develop to a visible condition images recorded on said film. The friction reducing agent adheres to the surface of the film, lubricating the passage of said film over substantially flat surfaces where the absence of such lubricant could cause frictional resistance. It should be understood that some of the friction reducing agent will be dislodged from the surface of the film strip during such passage over a relatively flat surface and transferred to such surface, but rather than being an undesirable feature, such a result is highly advantageous, thereby depositing some of the lubricant on the flat surface as well as the film itself providing enhanced slip properties since the inherent frictional resistance of the surface itself is minimized. It should be understood that while no particular methods are employed to strongly adhere the friction reducing agent to the surface of the film, in spite of the loss of such friction reducing agent to the contacted surfaces of the projector and other mechanisms, sufficient friction reducing agent remains on the surface of the film to provide the above-described lubricating properties.

Any suitable substance capable of reducing frictional resistance between the film strip and contacted adjacent surfaces may be employed as the friction reducing agent of the present invention. It should be understood, however, that such material is selected with regard to the photographic and structural integrity of the film and its photographic employment. Thus, the friction reducing agent should be transparent; it should not chemically attack or be otherwise deleterious to the materials employed in the formation of the film unit; it should not affect the photographic or optical properties of the film unit; and it should not be deleterious to the processing composition in which it is employed.

As examples of suitable friction reducing agents, mention may be made of waxes, fats and oils, preferably paraffin wax and microcrystalline waxes. Fatty acids are also suitably employed. Particulate polymeric materials are also advantageously employed such as, for example, particles of polytetrafluoroethylene (Teflon) approximately 0.3 to 1 micron in diameter.

The friction reducing agents may be dispersed in the processing composition as a dispersion, or as a solution of the processing composition, or they may be suitably dissolved prior to introduction into the processing composition. The quantity of friction reducing agent employed may vary over a wide range depending upon the particular frictional resistance present in a given system. Preferably, the level of friction reducing agent employed is 10 to 50 mgs. per square foot.

The processing composition of the present invention may be applied to the films by a variety of methods such as, for example, doctor blades, extrusion heads, capillary applicators, wicks, and the like. The amount of processing composition employed is determined by the film structure, the speed of the film as it passes the processing station, and the drying conditions, if any, employed.

In addition to the friction reducing agent, the processing composition may also contain an alkaline material such as, for example, sodium hydroxide, potasium hydroxide, sodium carbonate, and the like, and most preferably, in a concentration providing a pH to the processing composition in excess of about 12. The processing composition may, if desired, contain the sole silver halide developing agent or agents employed, or silver halide developing agent in addition to that disposed in the film unit. The relative proportions of the agents comprising the developing composition may be altered to suit the requirements of the operator. Thus, the developing composition may be modified by the employment of preservatives, alkalis, silver halide solvents, etc., other than those specifically mentioned. When desirable, it is often contemplated to include in the developing composition components such as restrainers, accelerators, and the like. The concentration of such agents may be varied over a relatively wide range commensurate with the art.

The photoresponsive material of photographic emulsion will, as previously described, preferably comprise a crystal of a compound of silver, for example, one or more of the silver halides, such as photosensitive silver chloride, silver iodide, silver bromide, or most preferably, mixed silver halides, such as silver chlorobromide or silver iodobromide, of varying halide ratios and the silver concentrations previously identified, most preferably dispersed in a processing composition permeable binder material.

In general, silver precipitating nuclei comprise a specific class of adjuncts well known in the art as adapted to effect catalytic reduction of solubilized silver halide specifically including heavy metals and heavy metal compounds such as the metals of Groups I-B, II-B, IV-A, VI-A, and VIII and the reaction products of Groups I-B, II-B, IV-A, and VIII metals with elements of Group VI-A, and may be effectively employed in the conventional concentrations traditionally employed in the art, preferably in a relatively low concentration in the order of about $1-25 \times 10^{-6}$ moles/ft.$^2$.

Especially suitable as silver precipitating agent are those disclosed in U.S. Pat. No. 2,698,237 and specifically the metallic sulfides and selenides, there detailed, these terms being understood to include the selenosulfides, the polysulfides, and the polyselenides. Preferred in this group are the so-called "heavy metal sulfides." For best results it is preferred to employ sulfides whose solubility products in an aqueous medium at approximately 20° C. vary between $10^{-23}$ and $10^{-30}$, and especially the salts of zinc, copper, cadium and lead. Also particularly suitable as precipitating agents are heavy metals such as silver, gold, platinum and palladium and in this category the noble metals illustrated are preferred and are generally provided in the matrix as colloidal particles.

The preferred silver halide type photographic emulsion 12, employed for the fabrication of the photographic film unit, may be prepared by reacting a water-soluble silver halide, such as ammonium, potassium or sodium bromide, preferably together with a corresponding iodide, in an aqueous solution of a peptizing agent such as colloidal gelatin solution; digesting the dispersion at an elevated temperature, to provide increased crystal growth; washing the resultant dispersion to remove undesirable reaction products and residual water-soluble salts, for example, employing the preferred gelatin matrix material, by chilling the dispersion, noodling the set dispersion, and washing the noodles with cold water, or, alternatively, employing any of the various floc systems, or procedures, adapted to effect removal of undesired components, for example, the procedures described in U.S. Pat. Nos. 2,614,928; 2,614,929; 2,728,662, and the like; after-ripening the dispersion at an elevated temperature in combination with the addition of gelatin or such other polymeric material as may be desired and various adjuncts, for example, chemical sensitizing agents and the like; all according to the traditional procedures of the art, as described in Neblette, C. B. Photography—Its Materials and Processes, 6th Ed., 1962.

Optical sensitization and preferably panchromatic sensitization of the emulsion's silver halide crystals may then be accomplished by contact with optical sensitizing dye or dyes; all according to the traditional procedures of the art, or described in Hamer, F. M., The Cyanine Dyes and Related Compounds.

Subsequent to optical sensitization, any further desired additives, such as coating aids and the like, may be incorporated in the emulsion and the mixture coated according to the conventional photographic emulsion coating procedures known in the art.

As the binder for the photoresponsive material, the aforementioned gelatin may be, in whole or in part, replaced with some other natural and/or synthetic processing composition permeable polymeric material such as albumin; casein; or zein or resins such as cellulose derivatives, as described in U.S. Pats. Nos. 2,322,085 and 2,541,474; vinyl polymers such as described in an extensive multiplicity of readily available U.S. and foreign patents or the photoresponsive material may be present substantially free of interstitial binding agent as described in U.S. Pats. Nos. 2,945,771; 3,145,566; 3,142,567; Newman, Comment on Non-Gelatin Film, B.J.O.P., 534, Sept. 15, 1961; and Belgian Pats. Nos. 642,557 and 642,558.

The discrete silver precipitating nuclei layer or layers 11 may be realized by the application of, location of, and/or in situ generation of, the nuclei directly or indirectly contiguous one or both surfaces of the photosensitive layer in the presence or absence of binder or matrix material and, in the latter instance, may comprise one or more adjacent or separated strata of a permeable material contiguous either or both surfaces containing one or more nuclei types disposed in one or more such layers. Matrix materials adapted for such employment may comprise both inorganic and organic materials the latter type preferably comprising natural or synthetic processing composition permeable, polymeric materials such as protein materials, for example, glues, gelatins, caseins, etc.; carbohydrate materials, for example, chitins, gums, starches, alginates, etc.; synthetic polymeric materials, for example, of the vinyl or cellulosic types such as vinyl alcohols, amides and acrylamides, regenerated celluloses and cellulose ethers and esters, polyamides and esters, etc., and the like; and the former type preferably comprising submacroscopic agglomerates of minute particles of a water-insoluble, inorganic, preferably siliceous material such, for example, as silica aerogel as disclosed in U.S. Pat. No. 2,698,237.

Where the silver precipitating agent is one or more of the heavy metal sulfides or selenides, it may be preferable to prevent the diffusion and wandering of the sulfide or selenide ions, as the case may be, by also including, in the silver precipitating layers or in separate layers closely adjacent thereto, at least one metallic salt which is substantially more soluble in the processing agent than the heavy metal sulfide or selenide used as the silver precipitating agent and which is irreducible in the processing agent. This more soluble salt has, as its cation, a metal whose ion forms sulfide or selenides which are difficultly soluble in the processing agent and which give up their sulfide or selenide ions to silver by displacement. Accordingly, in the presence of sulfide or selenide ions the metal ions of the more soluble salts have the effect of immediately precipitating the sulfide or selenide ions from solution. These more soluble or ion-capturing salts may be soluble salts of any of the following metals: cadmium, cerium (ous), cobalt (ous), iron, lead, nickel, manganese, thorium, and tin. Satisfactory soluble and stable salts of the above metals may be found, for example, among the following groups of salts: the acetates, the nitrates, the borates, the chlorides, the sulfates, the hydroxides, the formates, the citrates, and the dithionates. The acetates and nitrates of zinc, cadmium, nickel, and lead are preferred. In general, it is also preferable to use the white or lightly colored salts although for certain special purposes the more darkly colored salts may be employed.

The previously mentioned ion-capturing salts may also serve a function of improving the stability of the positive image provided they possess, in addition to the aforementioned characteristics, the requisites specified in U.S. Pat. No. 2,584,030. For example, if the ion-capturing salt is a salt of a metal which slowly forms insoluble or slightly soluble metallic hydroxides with the hydroxyl ions in the alkaline processing liquid, it will suitably control the alkalinity of the film unit to substantially, if not totally, prevent the formation of undesirable developer stains.

In accordance with a particularly preferred embodiment of the present invention, photosensitive and image-receiving strata carrying the image silver is fabricated to substantially prevent microscopic distortion of the image conformation by preventing microscopic migration or diffusion of image elements within the polymeric matrix. In general, conventional photographic image elements may ordinarily comprise a microscopically dynamic system without seriously noticeable disadvantage to the conventional employment of the image. However, for particularly accurate information recordation, microscopic distortion of image elements is preferably obviated to insure maximization of the accuracy of image reproduction. Specifically, it has been found that a photosensitive film unit comprising photosensitive emulsion containing silver halide crystals dispersed in a polymeric binder and a photoinsensitive image-receiving layer containing silver precipitating nuclei dispersed in a polymeric binder and a photoinsensitive image-receiving layer containing silver precipitating nuclei dispersed in a polymeric binder, the binders of which possess a lattice effective to substantially prevent microscopic migration or diffusion of image silver, provide image reproduction acuity particularly desired for effective information recordation in the manner previously described.

The desired polymeric binder lattice property may be readily achieved by selection of a polymeric material possessing the property of sufficiently fixing spacially image components, or a polymeric material, otherwise desired, may be modified, for example, by crosslinking and/or hardening, to the extent necessary to provide the desired spacial maintenance of image components, that is, a rigidity effective to spacially maintain positive image components. For example, a preferred polymeric binder material, that is, gelatin, may be hardened by contact with conventional hardening agents to the extent necessary to provide the desired rigidification of the photographic image. Where desired, discrete particulate materials facilitating increased processing composition penetration of the photosensitive element, without deleterious effect on the polymeric matrix's lattice, may be advantageously incorporated in the photosensitive element for the purpose of expediting processing of the element.

Support or film base may comprise any of the various types of transparent ridged or flexible supports, for example, glass, polymeric films of both the synthetic type and those derived from naturally occurring products, etc. Especially suitable materials, however, comprise flexible transparent synthetic polymers such as polymethacrylic acid, methyl and ethyl esters; vinyl chloride polymers; polyvinyl acetals; polyamides such as nylon; polyesters such as the polymeric films derived from ethylene glycol terephthalic acid; polymeric cellulose derivatives such as cellulose acetate, triacetate, nitrate, propionate, butyrate, acetate-butyrate, or acetate propionate; polycarbonates; polystyrenes; and the like.

The present invention will be illustrated in greater detail in conjunction with the following specific example which sets forth a representative fabrication of the film units of the present invention, which however, is not limited to the detailed description herein set forth but is intended to be illustrative only.

A gelatin subbed cellulose triacetate film base may be coated with a composition comprising deacetylated chitin and copper sulfide at a coverage of 4.4 mgs./ft.$^2$ deacetylated chitin and 0.25 mg./ft.$^2$ copper sulfide. On the external surface of the preceding layer a hardened gelatino silver iodobromide emulsion may then be coated at a coverage of 200 mgs./ft.$^2$ gelatin, 100 mgs./ft.$^2$ silver and 4.0 mgs./ft.$^2$ algin. The resultant film unit may then be overcoated with a layer comprising deacetylated chitin and copper sulfide at a coverage of 10.0 mgs./ft.$^2$ deacetylated chitin and 0.50 mg./ft.$^2$ copper sulfide.

The gelatino silver iodobromide emulsion employed may be prepared by heating a mixture comprising 80 grams of gelatin in 880 grams of water at a temperature of about 40° C. for the period required to dissolve the gelatin. The pH of the resultant solution may be adjusted to 10±0.1 and 8.8 grams of phthalic anhydride in 61.6 cc. of acetone added to the solution over a period of 30 minutes. Subsequent to addition of the phthalic anhydride the reaction mixture may be maintained at the stated temperature and pH for a period of about 30 minutes and then adjusted to a final pH of about 6.0.

To a solution comprising 226 grams of the gelatin phthalic anhydride derivative, prepared as above, 161 grams of potassium bromide, 2 grams of potassium iodide, and 1200 grams of water may be added a solution comprising 200 grams of silver nitrate in 1600 grams of water, at a rate of about 140 cc. per minute, for a period of about 3 minutes, held 10 minutes and the addition continued for a period of about 9 minutes. The resulting emulsion may then be precipitated by reducing the pH to about 2.5–3.0 with sulfuric acid. The precipitate may then be separated from the supernatant liquid and washed until the wash water is essentially free of excess potassium bromide. Ninety-five grams of gelatin may then be added to the precipitate, the volume adjusted with water to 845 cc., and dissolved by heating to about 38° C., for about 20 minutes, at a pH of about 5–6, and about 1.0 cc. of 1 N potassium bromide added to the emulsion. To the reaction mixture, at about 56° C., may be added about 5 cc. of a solution containing 0.1 gram of ammonium thiocyanate in 9.9 cc. of water and 0.4 cc. of a solution containing 0.097 gram of gold chloride in 9.9 cc. of water, and the mixture ripened at that temperature for about 37 hours. The resultant emulsion may then be panchromatically sensitized by the sequential addition of 0.1% by weight, methanol solutions of anhydro 5,5'-diphenyl-3,3'-bis-(4-sulfobutyl)-9-ethyl-oxacarbocyanine hydroxide and anhydro 5,5'-dimethyl-3,3'-bis-(3-sulfopropyl)-9-ethyl-thiocarbocyanine hydroxide in optionally effective concentrations. The copper sulfide silver precipitating agent may be provided, prior to coating, by the in situ addition of substantially equimolar quantities of copper acetate and sodium sulfide solutions.

The film unit, fabricated as detailed above, and in the form of a motion picture film strip, may be subjected to exposing electromagnetic radiation and developed by contacting the film unit in a device similar to that disclosed in application Ser. No. 755,901 for about 2 seconds with a processing composition comprising 180 cc. of water, 8.33 grams of sodium hydroxide, 16 grams of sodium thiosulfate, 6.48 grams of sodium sulfite, 0.42 gram of 6-nitrobenzimidazole, and 5 grams of 2,6-dimethylhydroquinone and 9% of a mixture based on the weight of the processing composition, of a dispersion of paraffin wax in carbon tetrachloride (5 g. in 100 g.), to provide production of a positive silver image possessing the optical characteristics described hereinbefore and the acuity required for effective image reproduction and rewound upon itself substantially immediately after contact with the processing composition.

When a film strip fabricated and processed according to the above procedure was run through a motion picture projector, less resistance was noted than with a film strip processed with a composition which did not contain the friction reducing agent.

As previously stated, the photosensitive silver halide emulsion and/or the silver precipitating nuclei containing layer may have advantageously incorporated therein discrete particulate materials providing increased porosity to the film unit, without deleterious effect on the dimensional stability of the binder lattice, in particular, those materials which additionally act as an antiswelling agent for the emulsion's binder material and, accordingly, act to facilitate the prevention of the carried image's microscopic distortion, particularly, with respect to an associated color screen, such as discrete silica particles dispersed, for example, in a concentration of about 0.3 to 1.5 silica per part binder, for the purpose of facilitating processing composition permeation of the film unit's emulsion and silver precipitating nuclei containing layers. In addition, the silver precipitating nuclei containing stratum distal the color screen may be advantageously overcoated with a processing composition permeable polymeric material such as a hardened gelatin pad or the like to advantageously promote uniformity in processing composition permeation of such stratum, by modulating any wave front resultant from initial surface contact with the liquid employed and to thereby promote uniform maintenance of the polymeric binder's physical characteristics.

Although chrome alum and particularly algin have been advantageously employed as hardening agents for the polymeric gelatin emulsion binder, it will be recognized that substantially any hardening or crosslinking agent may be employed, where necessary and with respect to any one or more layers of the film unit, which does not provide deleterious photographic effects, to the extent required to provide a binder lattice which effectively inhibits to a substantial effect, migration of image silver. An extensive collection of hardening agents are disclosed in the art as specifically adapted to effect hardening or crosslinking of photographic polymeric binder material compositions and by reason of their innocuous photographic effects are to be preferred in the practice of the present invention. The sole requirement for effective operation of the film unit is that the emulsion's polymeric lattice be constructed to provide the optical image parameters denoted hereinbefore. Thus, substantially any conventional hardening and crosslinking agent may be selected from those set forth throughout, for example, the pertinent patent literature regarding such agents, and the concentration employed, as known in the art, will be dependent upon the relative activity of the selected agent, or agents, and the relative amount of hardening or crosslinking to be effected. The specific concentration of a selective hardening or crosslinking agent, to be contacted with a selected polymeric binder, may be readily determined empirically, within the specific context of ultimate photographic employment, by screening. It will be further recognized that any of the various processing composition permeable, synthetic or natural polymeric materials, possessing the physical characteristics required to provide the results denoted above, may be substituted in replacement of the specifically illustrated polymeric materials provided that such selected polymer provides a matrix which is not deleterious to photosensitive silver halide crystals and possesses a lattice allowing processing in the manner previously described.

Suitable silver halide solvents for employment in the practice of the present invention include conventional fixing agents such as the previously noted sodium thiosulfate, sodium thiocyanate, ammonium thiocyanate, the additional agents described in U.S. Pat. No. 2,543,181, and the associations of cyclic imides and nitrogenous bases such as associations of barbiturates or uracils and ammonia or amines and other associations described in U.S. Pat. No. 2,857,274.

Where desired conventional silver toning agent or agents may be disposed within the emulsion composition in a concentration effective to provide a positive image toned in accordance with the desires of the operator.

In the preferred embodiment of the present invention, the processing composition will include an alkaline material, for example, sodium hydroxide, potassium hydroxide or sodium carbonate, or the like, and most preferably in a concentration providing a pH to the processing composition in excess of about 12. The processing composition may, where desired, contain the sole silver halide developing agent or agents employed, or a silver halide developing agent in addition to that disposed within the film unit; however, disposition of one or more developing agents in the emulsion and/or a permeable layer directly associated therewith, intermediate the emulsion and support, is a particularly preferred embodiment, for the purpose of providing unexposed image acuity, which more readily facilitates directly initiated development at radiation exposed areas of the emulsion without the necessity of diffusing such agents to such sites by means of the processing composition selected.

It will be apparent that the relative proportions of the agents comprising the developing composition set forth herein may be altered to suit the requirements of the operator. Thus, it is within the scope of this invention to modify the herein described developing compositions by the situation of preservatives, alkalis, silver halide solvents, etc., other than those specifically mentioned. When desirable, it is also contemplated to include, in the developing composition, components such as restrainers, accelerators, etc. The concentration of such agents may be varied over a relatively wide range commensurate with the art.

The processing composition solvent employed, however, will generally comprise water and will possess a solvent capacity which does not deleteriously hydrate the selected binder lattices beyond that required to provide the preferred image formation. Accordingly, no adjunct should be included within such composition which deleteriously effects the lattice parameters required for such image formation.

In addition to the described essential layers, it will be recognized that the film unit may also contain one or more subcoats or layers, which, in turn, may contain one or more additives such as plasticizers, intermediate essential layers for the purpose, for example, of enhancing adhesion, and that one or more of the described layers may comprise a composite of two or more strata which may be contiguous or separated from each other.

Since certain changes may be made in the above product, process and apparatus without departing from the scope of the invention herein involved, it is intended that all matter contained in the above description shall be interpreted as illustrative and not in a limited sense.

What is claimed is:

1. A photographic process which comprises, in combination, the steps of exposing an elongated photographic cine film strip comprising a permanent laminate which contains a common support carrying on one surface, in order, an additive color screen, a layer comprising silver precipitating nuclei and a layer comprising a photosensitive silver halide; contacting said exposed silver halide layer with an aqueous processing composition containing silver halide developing agent, silver halide solvent and a friction reducing agent; thereby providing a visible silver image to said film unit in terms of the unexposed areas of said silver halide layer as a function of the point-to-point degree of exposure thereof, and maintaining said laminate intact subsequent to processing.

2. The process as defined in claim 1 wherein said friction reducing agent comprises paraffin wax.

3. The process as defined in claim 1 wherein said friction reducing agent comprises particles of polytetrafluoroethylene.

4. The process as defined in claim 1 which comprises, in combination, the steps of exposing a photographic film unit which comprises a permanent fixed laminate containing a transparent support carrying on one surface, in order, an additive color screen, a first substantially photoinsensitive layer comprising silver precipitating nuclei dispersed in a processing composition permeable matrix, a photosensitive silver halide emulsion comprising photosensitive silver halide crystals dispersed in a processing composition permeable polymeric binder, a second substantially photoinsensitive layer comprising silver precipitating nuclei dispersed in a processing composition permeable matrix, said silver precipitating nuclei present in a concentration effective to provide, upon development, as a function of exposure, a silver image derived from development of unexposed silver halide crystals possessing a maximum image density of at least 1.0 density unit greater than the maximum density of the silver image derived from development of exposed silver halide crystals; contacting said silver halide emulsion with an aqueous processing composition containing a silver halide developing agent, a silver halide solvent and a friction reducing agent for a period of time effective to provide a visible silver image to said film unit in terms of the unexposed areas of said emulsion as a function of the point-to-point degree of emulsion exposure, said visible image derived from development of unexposed silver halide crystals and possessing a maximum image density of at least 1.0 density unit greater than the maximum density of developed silver derived from development of exposed silver halide crystals, and maintaining said laminate intact subsequent to said processing.

5. A process as defined in claim 4 wherein said silver halide emulsion comprises a silver iodobromide emulsion.

6. A process as defined in claim 5 wherein said silver iodobromide emulsion is panchromatically sensitized.

7. A process as defined in claim 6 wherein said silver iodobromide emulsion comprises silver iodobromide crystals containing about 1 to 9%, by weight, iodide.

8. A process as defined in claim 4 wherein said processing composition permeable polymeric binder comprises gelatin.

9. A process as defined in claim 4 wherein said silver prises gelatin.

10. A diffusion transfer photographic processing composition capable of processing unexposed light-sensitive material contained in a photographic film strip to produce a visible image therein which includes a friction reducing agent for said film.

11. The process as defined in claim 10 wherein said composition comprises a silver halide developing agent and silver halide solvent.

12. A composition as defined in claim 10 wherein said composition is an aqueous alkaline composition.

13. A composition as defined in claim 10 wherein said friction reducing means is dispersed therein.

14. A composition as defined in claim 10 wherein said friction reducing agent is in solution in said processing composition.

15. A composition as defined in claim 10 wherein said friction reducing agent is paraffin wax.

16. A composition as defined in claim 10 wherein said friction reducing agent is particulate polytetrafluoroethylene.

References Cited

UNITED STATES PATENTS

| | | | |
|---|---|---|---|
| 2,053,621 | 9/1936 | Mackler | 96—50 PL |
| 3,240,604 | 3/1966 | Cook | 96—78 |
| 2,874,045 | 2/1959 | Land | 96—50 PL |
| 1,548,951 | 8/1925 | Malone | 96—50 PL |
| 1,946,004 | 2/1934 | Steele | 96—50 PL |
| 2,719,791 | 10/1955 | Land | 96—29 |
| 2,698,236 | 12/1954 | Land | 96—29 |
| 3,529,962 | 9/1970 | Haas | 96—29 |
| 2,013,867 | 9/1935 | Sloan | 96—50 PL |
| 2,008,435 | 7/1935 | Caruso | 96—50 PL |

NORMAN G. TORCHIN, Primary Examiner

J. L. GOODROW, Assistant Examiner

U.S. Cl. X.R.

96—76

UNITED STATES PATENT OFFICE
CERTIFICATE OF CORRECTION

Patent No. 3,679,411          Dated July 25, 1972

Inventor(s) Robert K. Stephens

It is certified that error appears in the above-identified patent and that said Letters Patent are hereby corrected as shown below:

Column 12, line 60, claim 9 in the patent is incomplete and should read as follows:

--9. A process as defined in claim 4 wherein said silver precipitating nuclei comprises metallic sulfides, metallic selenides, or colloidal noble metals.--.

Column 4, line 68, "friction" should be --frictional--.

Signed and sealed this 9th day of January 1973.

(SEAL)
Attest:

EDWARD M. FLETCHER, JR.              ROBERT GOTTSCHALK
Attesting Officer                    Commissioner of Patents